(12) United States Patent
Sadakane

(10) Patent No.: US 12,401,062 B2
(45) Date of Patent: *Aug. 26, 2025

(54) NONAQUEOUS ELECTROLYTE SECONDARY BATTERY

(71) Applicant: PANASONIC INTELLECTUAL PROPERTY MANAGEMENT CO., LTD., Osaka (JP)

(72) Inventor: Takuya Sadakane, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 638 days.

This patent is subject to a terminal disclaimer.

(21) Appl. No.: 17/772,835

(22) PCT Filed: Sep. 17, 2020

(86) PCT No.: PCT/JP2020/035245
§ 371 (c)(1),
(2) Date: Apr. 28, 2022

(87) PCT Pub. No.: WO2021/084957
PCT Pub. Date: May 6, 2021

(65) Prior Publication Data
US 2022/0376302 A1   Nov. 24, 2022

(30) Foreign Application Priority Data
Oct. 31, 2019 (JP) .................. 2019-199421

(51) Int. Cl.
*H01M 10/0567* (2010.01)
*H01M 4/36* (2006.01)
(Continued)

(52) U.S. Cl.
CPC ....... *H01M 10/0567* (2013.01); *H01M 4/364* (2013.01); *H01M 4/505* (2013.01);
(Continued)

(58) Field of Classification Search
CPC ...... H01M 4/364; H01M 4/425; H01M 4/485; H01M 4/505; H01M 4/525; H01M 10/0567
See application file for complete search history.

(56) References Cited

U.S. PATENT DOCUMENTS

| | | | |
|---|---|---|---|
| 2005/0170253 | A1 | 8/2005 | Yoon et al. |
| 2013/0209882 | A1 | 8/2013 | Kim et al. |
| 2015/0147644 | A1 | 5/2015 | Kinoshita et al. |

FOREIGN PATENT DOCUMENTS

| | | |
|---|---|---|
| EP | 1 184 927 A1 | 3/2002 |
| JP | 2001-243957 A | 9/2001 |

(Continued)

OTHER PUBLICATIONS

Kimura et al., "Achievement of the High-Capacity Retention Rate for the Li[Ni0.8Co0.15Al0.05]O2 (NCA) Cathode Containing an Aqueous Binder with CO2 Gas Treatment Using the Cavitation Effect (CTCE)" Journal of The Electrochemical Society, 166 (3) A5313-A5317, Jan. 5, 2019.*

(Continued)

*Primary Examiner* — Kenneth J Douyette
(74) *Attorney, Agent, or Firm* — WHDA, LLP

(57) ABSTRACT

The nonaqueous electrolyte secondary battery includes a positive electrode, a negative electrode, and a nonaqueous electrolyte. The positive electrode includes a positive electrode mixture containing a positive electrode active material and an additive. The positive electrode active material contains a composite oxide containing lithium and a transition metal. The additive contains a particulate base material, (Continued)

and an organic compound group fixed to the surface of the base material by a covalent bond. The covalent bond contains a X—O-A bond. The element X is bonded to the organic compound group, and is at least one selected from the group consisting of Si and Ti. The element A is an element constituting the base material. The organic compound group has 2 or more carbon atoms.

12 Claims, 1 Drawing Sheet

(51) Int. Cl.
*H01M 4/50* (2010.01)
*H01M 4/505* (2010.01)
*H01M 4/525* (2010.01)
*H01M 10/0525* (2010.01)
*H01M 4/02* (2006.01)

(52) U.S. Cl.
CPC ....... *H01M 4/525* (2013.01); *H01M 10/0525* (2013.01); *H01M 2004/027* (2013.01); *H01M 2004/028* (2013.01)

(56) References Cited

FOREIGN PATENT DOCUMENTS

| | | | |
|---|---|---|---|
| JP | 2008-016414 A | 1/2008 | |
| JP | 2013-165061 A | 8/2013 | |
| JP | 2014-99295 A | 5/2014 | |
| JP | 2015-109227 A | 6/2015 | |
| JP | 2015-176760 A | 10/2015 | |
| JP | 2016-062760 A | 4/2016 | |
| JP | 2017-27768 A | 2/2017 | |
| KR | 20100070181 A | 6/2010 | |
| KR | 101147601 B1 | 5/2012 | |
| KR | 2014-0081741 A | 7/2014 | |
| WO | 01/59871 A1 | 8/2001 | |
| WO | 2016/098553 A1 | 6/2016 | |

OTHER PUBLICATIONS

Office Action dated Jan. 12, 2024, issued in counterpart CN Application No. 202080075820.0, with partial English translation. (8 pages).
International Search Report dated Nov. 2, 2020, issued in counterpart International application No. PCT/JP2020/035245, with English translation. (5 pages).
Written Opinion dated Nov. 2, 2020, issued in counterpart International application No. PCT/JP2020/035245. (3 pages).
Jurng Sunhyung et al., "Effect of electrolyte on the nanostructure of the solid electrolyte interphase (SEI) and performance of lithium metal anodes", Energy & Environmental Science, vol. 11, No. 9, Jan. 1, 2018 (Jan. 1, 2018), pp. 2600-2608, XP055846891; Cited in Extended European Search Report dated Dec. 21, 2022. (9 pages).
The Extended European Search Report dated Dec. 21, 2022, issued in counterpart EP No. 20882736.0. (7 pages).

* cited by examiner

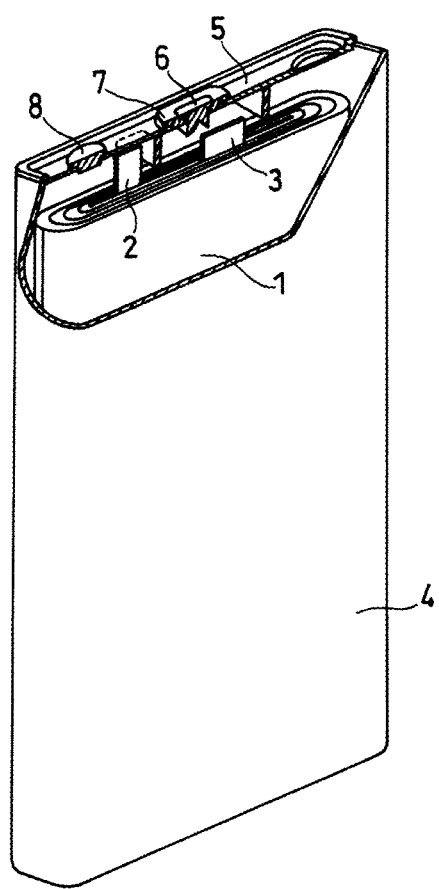

NONAQUEOUS ELECTROLYTE SECONDARY BATTERY

TECHNICAL FIELD

The present disclosure relates to a nonaqueous electrolyte secondary battery.

BACKGROUND ART

Nonaqueous electrolyte secondary batteries represented by lithium ion secondary batteries have high energy density and high output, and expected to be promising as a power supply of mobile devices such as smart-phones, power source of a vehicle such as an electric vehicle, and a storage device of natural energy such as sunlight. A composite oxide containing lithium and a transition metal is used for the positive electrode active material of the nonaqueous electrolyte secondary battery.

Patent Literature 1 has proposed a lithium ion secondary battery with a positive electrode mixture containing a composite oxide containing lithium, nickel, manganese, and cobalt, and the positive electrode mixture contains aluminum oxide with which a part or all of its surface coated with carbon. The hydrofluoric acid in the electrolyte is captured by the aluminum oxide with a large amount of hydroxyl groups present on the surface, and deterioration of the composite oxide due to the hydrofluoric acid is suppressed.

CITATION LIST

Patent Literature

PLT1: WO2016/098553

SUMMARY OF INVENTION

When the nonaqueous electrolyte secondary battery is exposed to a high temperature due to an internal short circuit or the like, a large amount of oxygen is generated from the positive electrode containing the composite oxide, and the internal pressure of the battery may rise. In addition, the nonaqueous electrolyte may be oxidized and decomposed by oxygen generated from the positive electrode, and the internal pressure of the battery may increase due to gas generation involved therewith. The battery case may be damaged due to the increase in the internal pressure of the battery, and the improvement of the safety of the battery is required.

In view of the above, one aspect of the present disclosure includes a nonaqueous electrolyte secondary battery including a positive electrode, a negative electrode, and a nonaqueous electrolyte, wherein the positive electrode includes a positive electrode mixture containing a positive electrode active material and an additive; the positive electrode active material includes a composite oxide containing lithium and a transition metal; the additive includes a particulate base material and an organic compound group fixed to the surface of the base material by a covalent bond; the covalent bond includes a X—O-A bond; the element X is bonded to the organic compound group and is at least one selected from the group consisting of Si and Ti; the element A is an element constituting the base material; and the organic compound group has 2 or more carbon atoms.

According to the present disclosure, the safety of the nonaqueous electrolyte secondary battery can be enhanced.

BRIEF DESCRIPTION OF DRAWINGS

FIG. 1 is a partially cutaway schematic oblique view showing a nonaqueous electrolyte secondary battery according to an embodiment of the present disclosure.

DESCRIPTION OF EMBODIMENTS

A nonaqueous electrolyte secondary battery according to an embodiment of the present disclosure includes a positive electrode, a negative electrode, and a nonaqueous electrolyte, and the positive electrode includes a positive electrode mixture including a positive electrode active material and an additive. The positive electrode active material includes a composite oxide containing lithium and a transition metal. The additive includes a particulate base material and an organic compound group fixed to the surface of the base material by a covalent bond. The covalent bond includes a X—O-A bond. The element X is bonded to the organic compound group and is at least one selected from the group consisting of Si and Ti. The element A is an element constituting the base material. The organic compound group has 2 or more carbon atoms.

When the battery is exposed to a high temperature due to an internal short circuit or the like, oxygen is generated from the positive electrode containing the composite oxide and is absorbed by the above additive. Specifically, the organic compound group present on the surface of the base material reacts with oxygen, and oxygen is consumed. Therefore, an increase in the internal pressure of the battery due to the generation of oxygen from the positive electrode is suppressed. In addition, oxidative decomposition of the nonaqueous electrolyte by oxygen generated from the positive electrode is suppressed, and the increase in the internal pressure of the battery due to gas generation caused by the oxidative decomposition is also suppressed. Therefore, damage to the battery case due to an increase in the internal pressure of the battery is suppressed, the safety of the battery is improved.

However, when the number of carbon atoms of the organic compound group is one, the reactivity between the organic compound group and oxygen decreases, and oxygen absorption by the additive becomes insufficient. On the other hand, when the number of carbon atoms of the organic compound group is 2 or more, the organic compound group and oxygen generated from the positive electrode easily come into contact with each other, and oxygen absorption by the additive is efficiently performed. A chain hydrocarbon group (alkyl group or the like) having 2 or more carbon atoms is a hydrophobic functional group, and the hydrocarbon chain can be linearly extended from the surface of the base material, and the reaction area with oxygen can be effectively increased.

In the additive, the organic compound group is firmly supported on the surface of the base material via a covalent bond containing a X—O-A bond. Examples of the element A include Al, Si, Ti, Mg, and Zr. The covalent bond containing the X—O-A bond is excellent in thermal stability and chemical stability, and also excellent in stability against nonaqueous electrolytes. Thus, the oxygen absorption effect by the additive is stably obtained. X is preferably Si in terms of cost advantage, and easy introduction of a functional group such as an organic compound group.

The additive has a bond of R—X—O-A on the surface of the base material, and preferably has a structure represented by general formula (1): R—X(OA)$_3$. In this case, X is preferably Si. R is an organic compound group. When having a structure represented by general formula (1): R—X(OA)$_3$, three covalent bonds are formed between the organic compound group and the base material, and the organic compound group is firmly immobilized on the surface of the base material.

The additive having a structure represented by general formula (1) on the surface of the base material can be easily formed, for example, by advancing the reaction of the following formula (Ia) using a base material having a large amount of hydroxyl groups on the surface and R—XQ$_3$. Q includes a hydroxyl group, a halogen atom, an alkoxy group or the like, and the alkoxy group includes a CH$_3$O group, C$_2$H$_5$O group, C$_3$H$_7$O group or the like.

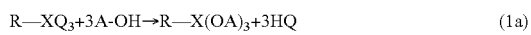  (1a)

The organic compound group immobilized on the surface of the base material by a covalent bond containing a X—O-A bond can be confirmed by, for example, using a spectroscopic technique. The spectroscopic techniques include, for example, energy-dispersive X-ray spectroscopy (EDX), Fourier transform infrared spectroscopy (FT-IR), and nuclear magnetic resonance (NMR) spectroscopy (measured nuclides are 1H, 13C, 29Si, etc.).

The number of carbon atoms of the organic compound group is preferably 2 or more and 12 or less, and more preferably 2 or more and 5 or less. In this case, an oxygen absorption effect by an additive is easily obtained.

The organic compound group is composed of at least a carbon atom and a hydrogen atom, and may include other atoms other than carbon atom and hydrogen atom. Examples of the other atom include an oxygen atom, a nitrogen atom, and a sulfur atom. The organic compound group may include a carbon-carbon double bond or triple bond. The organic compound group includes a chain hydrocarbon group or the like. The hydrocarbon group may be linear or branched. The organic compound group may include at least one selected from the group consisting of an alkyl group, an alkenyl group, and an alkynyl group. Examples of the alkyl group include an ethyl group, propyl group, and butyl group, among which the propyl group is preferred.

At least one of the hydrogen atoms of the organic compound group may be substituted by a substituent. For example, a hydrogen atom at the terminal of an alkyl group may be substituted by a substituent. The substituent may include at least one selected from the group consisting of an amino group, a methacryl group, and a thiol group.

The base material may be inorganic particles or organic particles. Preferably, the inorganic particles contain at least one kind of particles selected from the group consisting of aluminum oxide, silicon oxide, titanium oxide, magnesium oxide, and zirconium oxide. The aluminum oxide includes Alumina (Al$_2$O$_3$) and the like. The silicon oxide includes silica (SiO$_2$) and the like. The titanium oxide includes TiO$_2$ and the like. The magnesium oxide includes MgO and the like. The zirconium oxide includes ZrO$_2$ and the like. The inorganic particles may include particles of silica alumina (composite oxide including aluminum and silicon).

Among them, more preferably, the inorganic particles contain at least one kind of particles selected from the group consisting of aluminum oxide, silicon oxide and silica alumina, because a large amount of hydroxyl groups are usually present on the surface, and a covalent bond containing a X—O-A bond can be formed by a reaction of formula (1a) or the like to easily immobilize an organic compound group.

Among them, more preferably, the inorganic particles contain at least one kind of particles selected from the group consisting of aluminum oxide and silicon oxide, because it is advantageous in terms of cost and excellent in chemical stability and thermal stability.

The content of the additive in the positive electrode mixture is preferably 0.1 mass % or more and 10 mass % or less, more preferably 1 mass % or more and 4 mass % or less, relative to the entire positive electrode mixture. When the content of the additive in the positive electrode mixture is 0.1 mass % or more relative to the entire positive electrode mixture, the additive is sufficiently contained in the positive electrode mixture, and an oxygen absorption effect is easily obtained. When the content of the additive in the positive electrode mixture is 10 mass % or less relative to the entire positive electrode mixture, the positive electrode active material is easily secured sufficiently in the positive electrode mixture, and the battery is easily increased in capacity.

In the additive, the atomic ratio of element A contained in the base material to element X contained in the covalent bond: A/X is, for example, preferably 10 or more and 80 or less, more preferably 15 or more and 50 or less. When A/X is 10 or more, the surface area of the base material is easily secured sufficiently, and the organic compound group is easily supported on the surface of the base material. When A/X is 80 or less, the organic compound group is sufficiently present on the surface of the base material, and an oxygen absorption effect is easily obtained.

The atomic ratio A/X can be determined, for example, by the following method.

The battery is disassembled and the positive electrode is removed. The positive electrode is washed with a nonaqueous solvent; the nonaqueous electrolyte adhering to the positive electrode is removed; and the nonaqueous solvent is removed by drying. The positive electrode mixture is collected from the positive electrode and made into a solution with a predetermined acid to obtain a sample solution. Alternatively, the additive may be made into a solution with a predetermined acid to obtain a sample solution. Using the obtained sample solution, the amount of element A and the amount of element X in the sample solution are determined by inductively coupled plasma (ICP) emission spectrometry, and the atomic ratio A/X is calculated.

The positive electrode active material includes a composite oxide containing lithium and a metal Me other than lithium. The metal Me includes at least a transition metal. In view of high capacity, preferably, the transition metal contains at least nickel (Ni). When the composite oxide contains Ni, oxygen is easily generated from the positive electrode when the battery is exposed to a high temperature, so that an oxygen absorption effect by the additive is remarkably obtained.

The transition metal may include Ni and at least one element selected from the group consisting of cobalt (Co), manganese (Mn), iron (Fe), copper (Cu), chromium (Cr), titanium (Ti), niobium (Nb), zirconium (Zr), vanadium (V), tantalum (Ta), and molybdenum (Mo).

The metal Me may include a metal other than a transition metal. The metal other than the transition metal may include at least one selected from the group consisting of aluminum (Al), magnesium (Mg), calcium (Ca), strontium (Sr), zinc (Zn), and silicon (Si). In addition to the metal, the composite oxide may further include boron (B) or the like.

In view of increasing the capacity and improving the output characteristics, among others, the metal Me preferably contains Ni and at least one selected from the group consisting of Co, Mn, and Al, and more preferably contains Ni, Co, and Mn and/or Al. When the metal Me contains Co, the phase transition of the composite oxide containing Li and Ni is suppressed during charge and discharge, the stability of the crystal structure is improved, and the cycle characteristics are easily improved. When the metal Me contains Mn and/or Al, the thermal stability is improved.

In view of easily increasing the capacity, in the composite oxide, the atomic ratio of Ni to metal Me:Ni/Me is preferably 0.55 or more and less than 1, more preferably 0.7 or more and less than 1, and still more preferably 0.8 or more and less than 1. When Ni/Me is 0.7 or more, since the amount of oxygen generated when the battery is exposed to a high temperature is large, an oxygen absorption effect by the additive is remarkably obtained.

The composite oxide may have a structure represented by general formula (2): $LiN_{1-x}M_xO_2$ (where $0<x\leq0.2$ is satisfied, M is at least one element selected from the group consisting of Co, Al, Ti, Fe, and Mn). When x is greater than 0 and less than or equal to 0.2, the proportion of Ni in the metal other than Li is large, and the amount of oxygen generated when the battery is exposed to high temperature is large, so that the oxygen absorption effect by the additive can be remarkably obtained. In this case, it is easy to increase the capacity, and the effect of Ni and the effect of element M can be obtained in a well-balanced manner. In $LiNiO_2$, a rapid oxygen generation reaction hardly proceeds as compared with the composite oxide represented by general formula (2), because a decomposition reaction in which oxygen is slowly released in a lower temperature range than a temperature at which thermal runaway occurs in a battery can proceed.

The composite oxide may have a structure represented by general formula (3): $LiNi_{1-y-z}Co_yAl_zO_2$ ($0\leq y<0.2$, $0<z\leq0.05$, and $y+z\leq0.2$). When y indicating the composition ratio of Co is 0 or more and less than 0.2, a high capacity and a high output can be easily maintained, and stability of the crystal structure can be easily improved during charge and discharge. When z indicating the composition ratio of Al is greater than 0 and 0.05 or less, a high capacity and a high output can be easily maintained, and thermal stability can be easily improved. The composition ratio of Ni (1−y−z) is greater than 0 and 0.8 or less. In this case, since the ratio of Ni occupying the metal other than Li is large and the amount of oxygen generated when the battery is exposed to a high temperature is large, the oxygen absorption effect by the additive is remarkably obtained. In this case, the capacity can be easily increased, and the effect of Ni and the effect of Co and Al can be obtained in a well-balanced manner.

The ratio of the average particle size D1 of the composite oxide to the average particle size D2 of the particulate base material: D1/D2 is preferably 1.2 or more and 30 or less. The average particle size D1 and the average particle size D2 mean the median diameter in which the volume cumulative value is 50% in the particle size distribution on a volume basis. The above average particle size D1 and the average particle size D2 is determined by performing the particle size distribution measurement by the laser diffraction method. When D1/D2 is 1.2 or more, conductive networks between the particles of the composite oxide are likely to be sufficiently formed in the positive electrode mixture. When D1/D2 is 30 or less, the additive is suitably present around the particles of the composite oxide in the positive electrode mixture, and the oxygen absorption effect is easily obtained. D1/D2 is more preferably 1.4 or more and 10 or less.

The composite oxide usually includes secondary particles in which a plurality of primary particles are aggregated. The average particle size D1 of the composite oxide is, for example, 5 μm or more and 20 μm or less.

The average particle size D2 of the particulate base material is, for example, 1 μm or more and 10 μm or less.

Hereinafter, the configuration of the nonaqueous electrolyte secondary battery will be described more specifically.

(Positive Electrode)

The positive electrode includes, for example, a positive electrode current collector and a positive electrode mixture layer supported on the surface of the positive electrode current collector. The positive electrode mixture layer can be formed, for example, by applying a positive electrode slurry in which a positive electrode mixture is dispersed in a dispersion medium on a surface of the positive electrode current collector and drying the slurry. The dried film may be rolled, if necessary. The positive electrode mixture layer may be formed on one surface of the positive electrode current collector, or may be formed on both surfaces thereof. The positive electrode mixture includes a positive electrode active material and an additive as essential components, and may include a binder, a conductive agent, and the like as optional components. Examples of the dispersion medium include N-methyl-2-pyrrolidone (NMP).

Examples of the binder include resin materials such as, for example, fluororesin, polyolefin resin, polyamide resin, polyimide resin, acrylic resin, vinyl resin, polyvinylpyrrolidone, polyethersulfone, and rubber material. Examples of the fluororesin include polytetrafluoroethylene (PTFE), and polyvinylidene fluoride (PVDF). Examples of the rubber material include styrene-butadiene copolymer rubber (SBR). The binder may be used singly, or two or more kinds thereof may be used in combination.

Examples of the conductive agent include carbon blacks such as acetylene black; conductive fibers such as carbon fibers and metal fibers; and carbon fluoride. The conductive agent may be used singly, or two or more kinds thereof may be used in combination.

As the positive electrode current collector, for example, a metal foil can be used. As a metal composing the positive electrode current collector, for example, aluminum (Al), titanium (Ti), alloys containing these metal elements, stainless steel, and the like can be used. The thickness of the positive electrode current collector is not particularly limited, but is, for example, 3 to 50

(Negative Electrode)

The negative electrode may include a negative electrode current collector. In this case, lithium metal is deposited on the surface of the negative electrode current collector during charging, and lithium metal deposited on the surface of the negative electrode current collector is dissolved in the nonaqueous electrolyte during discharging. In a battery in which lithium metal is deposited on the surface of the negative electrode during charging, although it is advantageous to increase the capacity, oxygen generated from the positive electrode when the battery is exposed to high temperature due to a short circuit or the like tends to react with lithium metal deposited on the surface of the negative electrode, and the battery generates heat in association with the reaction, and oxygen generation is promoted. Therefore, in the battery in which lithium metal is deposited on the surface of the negative electrode during charging, the oxygen absorption effect by the additive is remarkably obtained.

As the negative electrode current collector, for example, a metal foil can be used. As a metal composing the negative electrode current collector, a metal which does not react with lithium metal is preferable, and for example, copper (Cu), nickel (Ni), iron (Fe), and an alloy containing any of these metal elements can be used. The thickness of the negative electrode current collector is not particularly limited, and is, for example, 5 µm or more and 300 µm or less.

The negative electrode may include a negative electrode current collector and a negative electrode mixture layer supported on the surface of the negative electrode current collector. In view of increasing the capacity, the thickness of the negative electrode mixture layer may be set to be sufficiently thin so that lithium metal can be deposited on the negative electrode during charging. In this case, the design capacity Cn of the negative electrode active material in the negative electrode mixture layer relative to the design capacity Cp of the positive electrode may satisfy Cn/Cp<1 and Cn/Cp<0.8. In this case, lithium metal is deposited on the surface of the negative electrode mixture layer during charging, and lithium metal deposited on the surface of the negative electrode mixture layer is dissolved in the nonaqueous electrolyte during discharging.

The negative electrode mixture layer can be formed, for example, by applying a negative electrode slurry in which a negative electrode mixture is dispersed in a dispersion medium on a surface of the negative electrode current collector and drying the slurry. The dried film may be rolled, if necessary. The negative electrode mixture layer may be formed on one surface of the negative electrode current collector, or on both surfaces thereof. As the dispersion medium, for example, water or NMP is used.

The negative electrode mixture includes a negative electrode active material as an essential component, and may include a binder, a conductive agent, a thickener, and the like as optional components. As the binder and the conductive agent, those exemplified for the positive electrode can be used. Examples of the thickener include carboxy methylcellulose (CMC) and a modified product thereof (Na salt and the like).

The negative electrode active material may contain a carbon material which absorbs and releases lithium ions. Examples of the carbon material for absorbing and releasing lithium ions include graphite (natural graphite, artificial graphite), soft carbon, and hard carbon. Preferred among them is graphite, which is excellent in stability during charging and discharging and has small irreversible capacity.

The negative electrode active material may include an alloy-based material. The alloy-based material is a material containing at least one kind of metal capable of forming an alloy with lithium, and includes, for example, silicon, tin, a silicon alloy, a tin alloy, a silicon compound, and the like. As the alloy-based material, a composite material having a lithium ion conductive phase and silicon particles dispersed in the phase may be used. As the lithium ion conductive phase, a silicate phase, a silicon oxide phase in which 95 mass % or more is silicon dioxide, a carbon phase, or the like may be used.

As the negative electrode active material, the alloy-based material and the carbon material can be used in combination. In this case, the mass ratio of the carbon material to the total of the alloy-based material and the carbon material is, for example, preferably 80 mass % or more, and more preferably 90 mass % or more.

(Nonaqueous Electrolyte)

The nonaqueous electrolyte contains lithium ions and anions, and has lithium ion conductivity. The nonaqueous electrolyte may be in a liquid form. The liquid nonaqueous electrolyte contains, for example, lithium ions, anions, and a nonaqueous solvent. The liquid nonaqueous electrolyte is prepared by dissolving a lithium salt in a nonaqueous solvent. By dissolving the lithium salt in a nonaqueous solvent, lithium ions and anions are generated.

The nonaqueous electrolyte may be in a gel form. The gel nonaqueous electrolyte contains, for example, lithium ions, anions, and a matrix polymer, and may further contain a nonaqueous solvent. As the matrix polymer, for example, a polymer material which absorbs and gels the nonaqueous solvent is used. Examples of the polymer material include fluororesin, acrylic resin, and polyether resin.

As the anion, for example, a known one used in the nonaqueous electrolyte of lithium secondary batteries can be used. Specific examples thereof include anions of $BF_4^-$, $ClO_4^-$, $PF_6^-$, $CF_3SO_3^-$, $CF_3CO_2^-$, and imides, and anions of oxalate complexes. Examples of the anions of the imides include $N(SO_2CF_3)_2^-$, $N(C_mF_{2m+1}SO_2)_x(C_nF_{2n+1}SO_2)_y^-$ (m and n are each independently an integer of 0 or 1 or more, and x and y are each independently 0, 1 or 2, and satisfy x+y=2). The anion of the oxalate complex may contain boron and/or phosphorus. Specific examples of the anion of the oxalate complex include $B(C_2O_4)_2^-$, difluoro(oxalate)borate anion: $BF_2(C_2O_4)^-$, $PF_4(C_2O_4)^-$, and $PF_2(C_2O_4)_2^-$. The anion may be used singly, or two or more kinds thereof may be used in combination.

When lithium metal is deposited on the surface of the negative electrode during charging, preferably, the nonaqueous electrolyte contains at least the anion of an oxalate complex. In this case, deposition of lithium metal in a dendritic state is suppressed. Due to the interaction between the anion of the oxalate complex and lithium, the lithium metal is easily deposited in a fine particulate form uniformly. Therefore, local deposition of lithium metal can be easily suppressed. Anions of the oxalate complex and other anions may be combined. Other anions may be anions of $PF_6^-$ and/or imides.

The concentration of the anion in the nonaqueous electrolyte may be 0.5 mol/L or more and 3.5 mol/L or less. Further, the concentration of the anion of the oxalate complex in the nonaqueous electrolyte may be 0.05 mol/L or more and 1 mol/L or less.

Examples of the nonaqueous solvent include ester, ether, nitrile, amide, or halogen substituted products thereof. The nonaqueous solvent may be used singly, or two or more kinds thereof may be used in combination. Examples of the halogen substituted product include fluoride.

Examples of the ester include cyclic carbonic acid esters, chain carbonic acid esters, cyclic carboxylic acid esters, and chain carboxylic acid esters. Examples of the cyclic carbonic acid ester include ethylene carbonate (EC) and propylene carbonate (PC). Examples of the chain carbonic acid ester include dimethyl carbonate (DMC), ethyl methyl carbonate (EMC), and diethyl carbonate (DEC). Examples of the cyclic carboxylic acid ester include γ-butyrolactone (GBL) and γ-valerolactone (GVL). Examples of the chain carboxylic acid ester include ethyl acetate, propyl acetate, and methyl propionate (PM).

Ether include cyclic ether and chain ether. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethylvinyl ether, and 1,2-diethoxyethane.

The nonaqueous electrolyte may include at least one selected from the group consisting of vinylene carbonate (VC), fluoroethylene carbonate (FEC), and vinyl ethylene carbonate (VEC). When the above component is contained, a good film is formed on the surface of the negative electrode, and the generation of dendrite of lithium metal is suppressed.

(Separator)

Usually, it is desirable to interpose a separator between the positive electrode and the negative electrode. The separator is excellent in ion permeability and has suitable mechanical strength and electrically insulating properties. The separator may be, for example, a microporous thin film, a woven fabric, or a nonwoven fabric. The separator is preferably made of, for example, polyolefin such as polypropylene and polyethylene.

The structure of the nonaqueous electrolyte secondary battery can be, for example, a structure in which an electrode group formed by winding a positive electrode and a negative electrode with a separator interposed therebetween and a nonaqueous electrolyte are accommodated in an outer case. Alternatively, instead of the wound-type electrode group, other forms of electrode groups may be applied, such as a laminated electrode group in which the positive electrode and the negative electrode are laminated with a separator interposed therebetween. The nonaqueous electrolyte secondary batteries may be of any form, for example, a cylindrical type, prismatic type, coin type, button type, laminated type, etc.

FIG. 1 is a partially cutaway schematic oblique view showing a prismatic nonaqueous electrolyte secondary battery according to an embodiment of the present disclosure.

The battery includes a bottomed prismatic battery case 4, an electrode group 1 housed in the battery case 4, and a nonaqueous electrolyte (not shown). The electrode group 1 has a negative electrode in the form of a long strip, a positive electrode in the form of a long strip, and a separator interposed therebetween for preventing direct contact therebetween. The electrode group 1 is formed by winding the negative electrode, the positive electrode, and the separator around a flat core and removing the core.

One end of a negative electrode lead 3 is attached to the negative electrode current collector of the negative electrode by welding or the like. The other end of the negative electrode lead 3 is electrically connected to a negative electrode terminal 6 provided on a sealing plate 5 through an insulating plate (not shown) made of resin. The negative terminal 6 is insulated from the sealing plate 5 by a resin gasket 7. To the positive electrode current collector of the positive electrode, one end of a positive lead 2 is attached by welding or the like. The other end of the positive lead 2 is connected to the rear surface of the sealing plate 5 through an insulating plate. That is, the positive electrode lead 2 is electrically connected to the battery case 4 which also serves as a positive electrode terminal. The insulating plate separates the electrode group 1 and the sealing plate 5 and separates the negative electrode lead 3 and the battery case 4. Periphery of the sealing plate 5 is fitted to the open end of the battery case 4, and the fitting portion is laser welded. In this manner, the opening of the battery case 4 is sealed by the sealing plate 5. The injection hole of the nonaqueous electrolyte provided in the sealing plate 5 is plugged by a sealing plug 8.

EXAMPLES

Hereinafter, the present disclosure will be specifically described based on Examples and Comparative Examples, but the present disclosure is not limited to the following Examples.

Example 1

(1) Production of Positive Electrode

N-methyl-2-pyrrolidone (NMP) was added to a positive electrode mixture and stirred to prepare a positive electrode slurry. As the positive electrode mixture, a mixture of a composite oxide (positive electrode active material) containing lithium and a transition metal, an additive, acetylene black (AB), and polyvinylidene fluoride (PVDF) was used. In the positive electrode mixture, the mass ratio of the composite oxide, AB, and PVDF was set to 100:2:2. The content of the additive in the positive electrode mixture was set to 2 mass % relative to the total of the positive electrode mixture. As the composite oxide, $LiNi_{0.90}Co_{0.07}Al_{0.03}O_2$ (average particle size D1: 10 μm) was used.

For the additive, $Al_2O_3$ particles (average particle size D2: 5 μm) having a propyl group ($C_3H_7$ group) as an organic compound group on the surface were used. Specifically, $Al_2O_3$ particles having a structure represented by $C_3H_7$—Si(OAl)$_3$ on their surfaces were used. The immobilization of $C_3H_7$ group on the surface of $Al_2O_3$ particles via a covalent bond (Si—O—Al) was carried out by allowing $Al_2O_3$ particles having OH groups on the surface to react with $Si(OCH_3)_3$—$C_3H_7$. By adjusting the quantity of $Si(OCH_3)_3$—$C_3H_7$, the atomic ratio Al/Si in the additive was set to 30. The ratio: D1/D2 of the average particle size D1 of the composite oxide to the average particle size D2 of $Al_2O_3$ particles was 2.

The positive electrode slurry was applied to the surface of an aluminum foil (thickness: 15 μm) which is a positive electrode current collector, and the coating film was dried and then rolled. In this manner, positive electrode mixture layers were formed on both sides of the aluminum foil to obtain a laminate. The laminate was cut to a predetermined size to obtain a positive electrode. In a partial region of the positive electrode, an exposed portion of the positive electrode current collector having no positive electrode mixture layer was formed. One end of a positive electrode lead made of aluminum was attached by welding to the exposed portion of the positive electrode current collector.

(2) Production of Negative Electrode

Electrolytic copper foil (thickness 10 μm) as a negative electrode current collector was cut to a predetermined size to obtain a negative electrode. One end of the negative electrode lead made of nickel was attached to the negative electrode current collector by welding.

(3) Preparation of Nonaqueous Electrolyte

In a nonaqueous solvent, $LiPF_6$ and $LiBF_2(C_2O_4)$ were dissolved to prepare a nonaqueous electrolyte. As the nonaqueous solvent, a mixed solvent containing fluoroethylene carbonate (FEC), ethyl methyl carbonate (EMC), and dimethyl carbonate (DMC) at a volume ratio of 20:5:75 was used. The concentration of $LiPF_6$ in the nonaqueous electrolyte was set to 1.0 mol/L. The concentration of $LiBF_2(C_2O_4)$ in the nonaqueous electrolyte was set to 0.5 mol/L.

(4) Production of Nonaqueous Electrolyte Secondary Battery

The positive electrode and negative electrode were wound with a polyethylene separator interposed therebetween to produce a wound-type electrode group. After the electrode group was dried under vacuum, it was accommodated in a battery case which also served as a negative electrode terminal. At this time, on the top and bottom of the electrode group, an upper insulating plate and a lower insulating plate made of resin were arranged, respectively. For the battery case, a bottomed cylindrical iron case (outer diameter 21 mm, height 70 mm) was used. Next, a nonaqueous electrolyte was injected into the battery case, and then the opening of the battery case was closed using a sealing body made of metal serving also as a positive electrode terminal. At this time, a resin gasket was interposed between the open end of the sealing body and the battery case. The other end of the positive electrode lead was connected to the sealing body, and the other end of the negative electrode lead was connected to the inner bottom surface of the battery case. In this manner, a 21700-type cylindrical nonaqueous electrolyte secondary battery A1 was produced.

Example 2

A battery A2 was produced in the same manner as in Example 1, except that the content of the additive in the positive electrode mixture was changed to 4 mass % relative to the entire positive electrode mixture.

Comparative Example 1

A battery B1 was produced in the same manner as in Example 1, except that no additive was contained in the positive electrode mixture.

Comparative Example 2

As an additive, $Al_2O_3$ particles were used as they were. The content of $Al_2O_3$ particles in the positive electrode mixture was set to 4 mass % relative to the entire positive electrode mixture. Except for the above, a battery B2 was produced in the same manner as in Example 1. $Al_2O_3$ particles usually have a lot of hydroxyl groups on their surfaces.

Comparative Example 3

$Al_2O_3$ particles having a methyl group ($CH_3$ group) on their surfaces were used as the additive. Specifically, $Al_2O_3$ particles having a structure represented by $CH_3$—$Si(OAl)_3$ on their surfaces were used. The immobilization of $CH_3$ groups on the surfaces of $Al_2O_3$ particles via the covalent bond (Si—O—Al) was carried out by allowing $Si(OCH_3)_3$—$CH_3$) to react with $Al_2O_3$ particles having OH groups on their surfaces. The content of the additive in the positive electrode mixture was set to 4 mass % relative to the entire positive electrode mixture. Except for the above, a battery B3 was produced in the same manner as in Example 1.

Comparative Example 4

$Al_2O_3$ particles coated with carbon on their surfaces were used as additives. The $Al_2O_3$ particles whose surface was coated with carbon were obtained by mixing $Al_2O_3$ particles and the polyvinyl alcohol powder at a mass ratio of 100:70 and baking at 850° C. for 1 hour in a nitrogen atmosphere. The content of the additive in the positive electrode mixture was set to 4 mass % relative to the entire positive electrode mixture. Except for the above, a battery B4 was produced in the same manner as in Example 1.

Batteries A1 to A2 and B1 to B4 were evaluated as follows.

[Evaluation: Measurement of Gas Generation Rate]

The battery obtained above was subjected to constant current charging until the voltage reaches 4.3V at a current of 0.1 C, and thereafter, subjected to constant voltage charging at a voltage of 4.3V until the current reaches 0.01 C in an environment of 25° C. In this manner, a battery in a fully charged state was obtained. In batteries A1 to A2 and B1 to B4, Li metal was deposited on the surface of the negative electrode current collector by charging.

The battery in a fully charged state was accommodated in a sealed container, and an internal short circuit was generated in the battery by nail penetration to generate heat in the battery. At this time, the change with time in the amount of gas generated from the battery was measured. The amount of gas generated from the battery was calculated by measuring the pressure P in the sealed container with a pressure sensor, measuring the temperature T in the sealed container with a thermocouple, and using the gas state equation: PV=nRT (V is the volume in the sealed container, n is the physical amount of gas, and R is the gas constant). Based on the measurement result, the maximum value of the gas generation per unit time was obtained, and the gas generation rate was determined. The gas generation rate was expressed as an index, setting the gas generation rate of Battery B1 of Comparative Example 1 to 100.

The evaluation results are shown in Table 1.

TABLE 1

| | Battery No. | Supported on $Al_2O_3$ particle surface | Additive content in positive electrode mixture (mass %) | Negative electrode during charging | Gas generation rate (Index) |
|---|---|---|---|---|---|
| Example 1 | A1 | Propyl group | 2 | Li metal deposits on negative electrode current collector | 25 |
| Example 2 | A2 | Propyl group | 4 | | 57 |
| Comp. Ex. 1 | B1 | — | 0 | | 100 |
| Comp. Ex. 2 | B2 | Hydroxyl group | 4 | | 91 |
| Comp. Ex. 3 | B3 | Methyl group | 4 | | 82 |
| Comp. Ex. 4 | B4 | Carbon | 4 | | 94 |

In Batteries A1 to A2 of Examples 1 to 2, the gas generation rate was greatly reduced and the increase in the battery internal pressure was greatly suppressed compared with Batteries B1 to B4 of Comparative Examples 1 to 4.

Example 3

(1) Preparation of Negative Electrode

Water was added to the negative electrode mixture and stirred to prepare a negative electrode slurry. As the negative electrode mixture, a mixture of artificial graphite (average particle size: 25 styrene-butadiene rubber (SBR), and sodium carboxy methylcellulose (CMC-Na) was used. In the negative electrode mixture, the mass ratio of artificial graphite, SBR, and CMC-Na was set to 100:1:1.

Next, the negative electrode slurry was applied to the surface of a copper foil, and the coating was dried and then rolled to form a laminate in which negative electrode mixture layers were formed on both surfaces of the copper foil. The laminate was cut to a predetermined size to produce a negative electrode.

(2) Preparation of Nonaqueous Electrolyte

A nonaqueous electrolyte was prepared by dissolving $LiPF_6$ in a mixed solvent (volume ratio 1:1) of ethylene carbonate (EC) and diethyl carbonate (DEC) at a concentration of 1.2 mol/L.

A battery C1 was produced in the same manner as in Example 1, except that the negative electrode and the nonaqueous electrolyte obtained above were used. The thickness of the negative electrode mixture layer was adjusted so that Li metal was not deposited on the surface of the negative electrode during charging. That is, the design capacity Cn of the negative electrode derived from the negative electrode active material in the negative electrode mixture layer was made larger than the design capacity Cp of the positive electrode.

Comparative Example 5

A battery D1 was produced in the same manner as in Example 3, except that no additive was contained in the positive electrode mixture.

Battery C1 of Example 3 and battery D1 of Comparative Example 5 were charged in the same manner as in the above evaluation, and the gas generation rate was determined. In batteries C1 and B5, lithium ions were stored in graphite in the negative electrode mixture by charging. The evaluation results are shown in Table 2. The gas generation rate of battery C1 of Example 3 was expressed as an index, setting the gas generation rate of battery D1 of Comparative Example 5 to 100.

TABLE 2

| | Battery No. | Supported on $Al_2O_3$ particle surface | Additive content in positive electrode mixture (mass %) | Negative electrode during charging | Gas generation rate (Index) |
|---|---|---|---|---|---|
| Example 3 | C1 | Propyl group | 2 | Graphite in negative electrode mixture stores Li ions | 74 |
| Comp. Ex. 5 | D1 | — | 0 | | 100 |

In battery C1 of Example 3, the gas generation rate was smaller than that of battery D1 of Comparative Example 5, and an increase in the internal pressure of the battery was suppressed.

INDUSTRIAL APPLICABILITY

The nonaqueous electrolyte secondary battery according to the present disclosure is suitably used as, for example, a power supply of a mobile device such as a smart phone, a power source of a vehicle such as an electric vehicle, or a storage device of natural energy such as sunlight.

REFERENCE SIGNS LIST

1 Electrode group
2 Positive electrode lead
3 Negative electrode lead
4 Battery case
5 Sealing plate
6 Negative electrode terminal
7 Gasket
8 Sealing plug

The invention claimed is:

1. A nonaqueous electrolyte secondary battery comprising a positive electrode, a negative electrode, and a nonaqueous electrolyte, wherein
the positive electrode includes a positive electrode mixture comprising a positive electrode active material and an additive,
the positive electrode active material comprises a composite oxide comprising lithium and a transition metal,
the additive comprises a particulate base material, and an organic compound group fixed to a surface of the base material by a covalent bond,
the covalent bond comprises a X—O-A bond,
the element X is bonded to the organic compound group, and is at least one selected from the group consisting of Si and Ti,
the element A is an element constituting the base material, and
the organic compound group has 2 or more carbon atoms.

2. The nonaqueous electrolyte secondary battery according to claim 1, wherein the organic compound group has 2 or more and 12 or less carbon atoms.

3. The nonaqueous electrolyte secondary battery according to claim 2, wherein the number of carbon atoms is 2 or more and 5 or less.

4. The nonaqueous electrolyte secondary battery according to claim 1, wherein the organic compound group includes at least one selected from the group consisting of an alkyl group, an alkenyl group, and an alkynyl group.

5. The nonaqueous electrolyte secondary battery according to claim 1, wherein at least one hydrogen atom of the organic compound group is substituted by a substituent, and
the substituent includes at least one selected from the group consisting of an amino group, a methacryl group, and a thiol group.

6. The nonaqueous electrolyte secondary battery according to claim 1, wherein the additive has a structure represented by general formula (1): R—X(OA)$_3$ on the surface of the base material, and
in general formula (1), R is the organic compound group.

7. The nonaqueous electrolyte secondary battery according to claim 1, wherein the transition metal includes at least nickel.

8. The nonaqueous electrolyte secondary battery according to claim 7, wherein the composite oxide has a structure represented by general formula (2): LiNi$_{1-x}$M$_x$O$_2$,
in general formula (2), 0<x≤0.2 is satisfied, and M is at least one element selected from the group consisting of Co, Al, Ti, Fe, and Mn.

9. The nonaqueous electrolyte secondary battery according to claim 7, wherein the composite oxide has a structure represented by general formula (3): LiNi$_{1-y-z}$Co$_y$Al$_z$O$_2$, and
in general formula (3), 0≤y<0.2, 0<z≤0.05 and y+z≤0.2 are satisfied.

10. The nonaqueous electrolyte secondary battery according to claim 1, wherein the base material comprises inorganic particles, and
the inorganic particles include at least one of particles selected from the group consisting of aluminum oxide, silicon oxide, titanium oxide, magnesium oxide, silica alumina, and zirconium oxide.

11. The nonaqueous electrolyte secondary battery according to claim 1, wherein a content of the additive in the positive electrode mixture is 0.1 mass % or more and 10 mass % or less relative to the entire positive electrode mixture.

12. The nonaqueous electrolyte secondary battery according to claim 10, wherein the aluminum oxide includes Al$_2$O$_3$, the silicon oxide includes SiO$_2$, the titanium oxide includes TiO$_2$, the magnesium oxide includes MgO, and the zirconium oxide includes ZrO$_2$.

* * * * *